(12) United States Patent
Furukawa et al.

(10) Patent No.: US 7,066,566 B2
(45) Date of Patent: Jun. 27, 2006

(54) PRINT INSPECTION APPARATUS, PRINTING SYSTEM, METHOD OF INSPECTING PRINT DATA AND PROGRAM

(75) Inventors: Itaru Furukawa, Kyoto (JP); Takashi Mouri, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 219 days.

(21) Appl. No.: 10/751,520

(22) Filed: Jan. 6, 2004

(65) Prior Publication Data

US 2004/0160628 A1    Aug. 19, 2004

(30) Foreign Application Priority Data

Feb. 14, 2003    (JP) .......................... P2003-036325

(51) Int. Cl.
*H04N 1/58*    (2006.01)

(52) U.S. Cl. .................... 347/15; 358/1.9; 358/1.2; 358/2.1; 347/19

(58) Field of Classification Search ................ 347/15; 358/1.9, 2.1, 1.2
See application file for complete search history.

(56) References Cited

U.S. PATENT DOCUMENTS 6,198,494 B1 *    3/2001    Haraguchi et al. .......... 347/232

FOREIGN PATENT DOCUMENTS

| JP | 7-219202 | 8/1995 |
| JP | 8-304997 | 11/1996 |
| JP | 9-166864 | 6/1997 |

* cited by examiner

*Primary Examiner*—Manish S. Shah
*Assistant Examiner*—Laura E. Martin
(74) *Attorney, Agent, or Firm*—McDermott Will & Emery LLP (57) ABSTRACT

A sharpness conversion part is provided in a print inspection apparatus and performs an average-masking operation to weaken a sharpness of object image data to be inspected and that of reference image data. After that, a differential value between these data is acquired. With this operation, an inspection for printing is performed by using image data of which the difference is distinguishable by human's visual property, not considering an invisible differential value which is caused by pixel displacement in subpixel order, and it is therefore possible to efficiently obtain a print inspection result with an accuracy almost as high as that by visual inspection. Thus, a print inspection apparatus can be provided, which is capable of correctly extracting difference to be detected by visual check.

5 Claims, 7 Drawing Sheets

| 0 | 0 | 0 | 0 | 0 | 0 | 0 | 0 | 0 | 0 | 0 | 0 | 0 | 0 |
|---|---|---|---|---|---|---|---|---|---|---|---|---|---|
| 0 | 0 | 0 | 0 | 0 | 0 | 0 | 0 | 0 | 100 | 100 | 100 | 100 | 0 |
| 0 | 0 | 0 | 0 | 0 | 0 | 100 | 100 | 100 | 100 | 0 | 0 | 0 | 0 |
| 0 | 0 | 0 | 100 | 100 | 100 | 100 | 0 | 0 | 0 | 0 | 0 | 0 | 0 |
| 100 | 100 | 100 | 100 | 100 | 100 | 100 | 0 | 0 | 0 | 0 | 0 | 0 | 0 |
| 100 | 100 | 100 | 100 | 0 | 0 | 0 | 0 | 0 | 0 | 0 | 0 | 0 | 0 |

FIG. 4B
                                                                          DO1↓

| 0 | 0 | 0 | 0 | 0 | 0 | 0 | 0 | 0 | 50 | 50 | 50 | 50 | 0 |
|---|---|---|---|---|---|---|---|---|---|---|---|---|---|
| 0 | 0 | 0 | 0 | 0 | 0 | 50 | 50 | 50 | 100 | 50 | 50 | 50 | 0 |
| 0 | 0 | 0 | 50 | 50 | 50 | 100 | 50 | 50 | 50 | 0 | 0 | 0 | 0 |
| 50 | 50 | 50 | 100 | 100 | 100 | 100 | 0 | 0 | 0 | 0 | 0 | 0 | 0 |
| 100 | 100 | 100 | 100 | 50 | 50 | 50 | 0 | 0 | 0 | 0 | 0 | 0 | 0 |
| 50 | 50 | 50 | 50 | 0 | 0 | 0 | 0 | 0 | 0 | 0 | 0 | 0 | 0 |

FIG. 4C
                                                                          DCO↓

| 0 | 0 | 0 | 0 | 0 | 0 | 0 | 0 | 0 | 50 | 50 | 50 | 50 | 0 |
|---|---|---|---|---|---|---|---|---|---|---|---|---|---|
| 0 | 0 | 0 | 0 | 0 | 0 | 50 | 50 | 50 | 0 | -50 | -50 | -50 | 0 |
| 0 | 0 | 0 | 50 | 50 | 50 | 0 | -50 | -50 | -50 | 0 | 0 | 0 | 0 |
| 50 | 50 | 50 | 0 | 0 | 0 | 0 | 0 | 0 | 0 | 0 | 0 | 0 | 0 |
| 0 | 0 | 0 | 0 | -50 | -50 | -50 | 0 | 0 | 0 | 0 | 0 | 0 | 0 |
| -50 | -50 | -50 | -50 | 0 | 0 | 0 | 0 | 0 | 0 | 0 | 0 | 0 | 0 |

| 0 | 0 | 0 | 0 | 0 | 0 | 0 | 0 | 11 | 22 | 33 | 33 | 22 | 11 |
|---|---|---|---|---|---|---|---|---|---|---|---|---|---|
| 0 | 0 | 0 | 0 | 0 | 11 | 22 | 33 | 44 | 44 | 44 | 33 | 22 | 11 |
| 0 | 0 | 11 | 22 | 33 | 44 | 44 | 44 | 44 | 44 | 44 | 33 | 22 | 11 |
| 22 | 33 | 44 | 56 | 67 | 78 | 67 | 56 | 33 | 22 | 11 | 0 | 0 | 0 |
| 44 | 67 | 78 | 78 | 78 | 67 | 44 | 22 | 0 | 0 | 0 | 0 | 0 | 0 |
| 44 | 67 | 67 | 56 | 44 | 33 | 22 | 11 | 0 | 0 | 0 | 0 | 0 | 0 |

DS2 ↓ (column 9)

FIG. 5B

| 0 | 0 | 0 | 0 | 0 | 6 | 11 | 17 | 28 | 33 | 39 | 33 | 22 | 11 |
|---|---|---|---|---|---|---|---|---|---|---|---|---|---|
| 0 | 0 | 6 | 11 | 17 | 28 | 33 | 39 | 44 | 44 | 44 | 33 | 22 | 11 |
| 11 | 17 | 28 | 39 | 50 | 61 | 56 | 50 | 39 | 33 | 28 | 17 | 11 | 6 |
| 33 | 50 | 61 | 67 | 72 | 72 | 56 | 39 | 17 | 11 | 6 | 0 | 0 | 0 |
| 44 | 67 | 72 | 67 | 61 | 50 | 33 | 17 | 0 | 0 | 0 | 0 | 0 | 0 |
| 33 | 50 | 50 | 39 | 28 | 17 | 11 | 6 | 0 | 0 | 0 | 0 | 0 | 0 |

| 0 | 0 | 0 | 0 | 0 | 6 | 11 | 17 | 17 | 11 | 6 | 0 | 0 | 0 |
|---|---|---|---|---|---|---|---|---|---|---|---|---|---|
| 0 | 0 | 6 | 11 | 17 | 17 | 11 | 6 | 0 | 0 | 0 | 0 | 0 | 0 |
| 11 | 17 | 17 | 17 | 17 | 17 | 11 | 6 | -6 | -11 | -17 | -17 | -11 | -6 |
| 11 | 17 | 17 | 11 | 6 | -6 | -11 | -17 | -17 | -11 | -6 | 0 | 0 | 0 |
| 0 | 0 | -6 | -11 | -17 | -17 | -11 | -6 | 0 | 0 | 0 | 0 | 0 | 0 |
| -11 | -17 | -17 | -17 | -17 | -17 | -11 | -6 | 0 | 0 | 0 | 0 | 0 | 0 |

|     | j−1 | j | j+1 | → l |
|-----|-----|---|-----|-----|
| i−1 | 1   | 2 | 1   |     |
| i   | 2   | 4 | 2   |     |
| i+1 | 1   | 2 | 1   |     |

↓ k

PRINT INSPECTION APPARATUS, PRINTING SYSTEM, METHOD OF INSPECTING PRINT DATA AND PROGRAM

BACKGROUND OF THE INVENTION

1. Field of the Invention

The present invention relates to an inspection for printing (or print data) in a printing work flow, and more particularly to an inspection of digital print data.

2. Description of the Background Art

Inspection for printing generally refers to an operation which is performed before generation of a plate-making film and a printing plate in a printing work flow, to check if there are any error in a camera-ready art, a film or the like which are respective original bases of the printing plate, the plate-making film, or the like. Recently, with progress of DTP (desktop publishing) technique, an apparatus has been well-known which performs an inspection of digital print data, together with color proof, by comparing print data of the first proof and that of the revised proof with each other, both of which are processed (rasterized) by an RIP (raster image processor), by pixel on a display screen to detect a differential value of color density (tone value) of each pixel. Since a CTP (Computer To Plate) process for direct plate making from the print data which is processed by the RIP and a digital printing for directly producing a printed matter have become general work flows in these days, the inspection of digital print data becomes increasingly important.

Among such conventional processing methods for inspection of digital print data is a so-called "swing (shift) method". This is a method, as disclosed in, e.g., Japanese Patent Application Laid Open Gazette No. 9-166864, where even when an arrangement position of a linework image or a picture image in image data (object image data) of a print image (object image) to be inspected deviates from that in image data (reference image data) of a print image (reference image) serving as a reference for inspection, and in other words, there is a pixel displacement, the pixel displacement can be cancelled to allow detection of a proper differential value or the like by virtually shifting (moving in parallel) the arrangement position of either image data and then comparing these image data with each other.

When the pixel displacement is caused by half pixel (in subpixel order), not by pixel, in the linework image and the picture image, however, the above swing (shift) method arises a problem of not correctly canceling the displacement. In a case of linework represented by binary data, for example, when there is a pixel displacement by half pixel between the arrangement position of the reference image and that of the object image before RIP development, there arises a difference in jaggies between both image data generated as the result of the RIP development. It means that there is a difference in form of linework between the reference image data and the object image data. In a case of multitone picture image, when there is a pixel displacement by half pixel, an unnecessary interpolation is made within a range of the pixel positions where the displacement occurs and pixels of intermediate value are thereby generated. The same phenomenon occurs also when scaling of an image is performed after the RIP development. There is a processing case for permitting such a half-pixel displacement or the like, for example, where it is assumed that there is no pixel displacement if a differential value is equal to or lower than a predetermined threshold value, or the like. But such a processing is not practical since when a pixel of intermediate value is generated between a pixel of blank fill having a tone value of 0% and a pixel of solid fill having a tone value of 100%, it is necessary to provide a tolerance of 50% in tone value in order to permit this displacement.

On the other hand, while the conventional inspection for printing on the basis of a printed matter which is actually outputted is performed by visual check and therefore its detectivity is limited within the image resolution of human's visual property, the inspection of digital print data arises a new problem that an invisible difference is detected since comparison is made by using numeric data such as a tone value of image. In many cases, the invisible differences do not need to be detected but are detected in a large number. This causes a disadvantageous situation where a "difference to be properly detected" is mixed into information on the unnecessarily-detected differences and eventually ignored.

When a resolution of image data to be inspected is 400 dpi, for example, if the displacement occurs within several pixels, this displacement does not become a problem in most cases since it can not be detected by the visual check. As a matter of course, a displacement within less than one pixel (i.e., subpixel) does not become a problem.

SUMMARY OF THE INVENTION

The present invention is intended for a print inspection apparatus for performing an inspection for printing, particularly an inspection of digital print data in a printing work flow, and a printing system comprising the print inspection apparatus.

According to the present invention, the print inspection apparatus comprises an image sharpness conversion element for converting an image sharpness of inspection object data which is acquired in a processing on print image data and that of reference data which represents an image condition as a reference for comparison with the inspection object data by performing an average-masking operation on pixels constituting the inspection object data and pixels constituting the reference data on the basis of a predetermined mask size, respectively; and a comparison element for comparing the inspection object data and the reference data with each other after converting their respective image sharpnesses, to perform an inspection for printing.

Since the inspection for printing is performed after conversion in image sharpness of the images through a grading operation by the average-masking operation, it is possible to avoid detection of differential value at a visually-unrecognizable level, which is caused by a pixel displacement in subpixel order. This produces an effect of efficiently obtaining a print inspection result with an accuracy almost as high as that by visual inspection. In other words, since the print inspection result is obtained with an accuracy almost as high as that by human's visual property, it is possible to efficiently obtain an effective print inspection result.

It is an object of the present invention to remove an "invisible difference" caused in an inspection for printing as a result of pixel displacement in subpixel order and to provide a print inspection apparatus capable of correctly extracting a "difference to be detected" which should be detected by visual inspection.

These and other objects, features, aspects and advantages of the present invention will become more apparent from the following detailed description of the present invention when taken in conjunction with the accompanying drawings.

DESCRIPTION OF THE PREFERRED EMBODIMENTS

System Configuration

Figure 1:
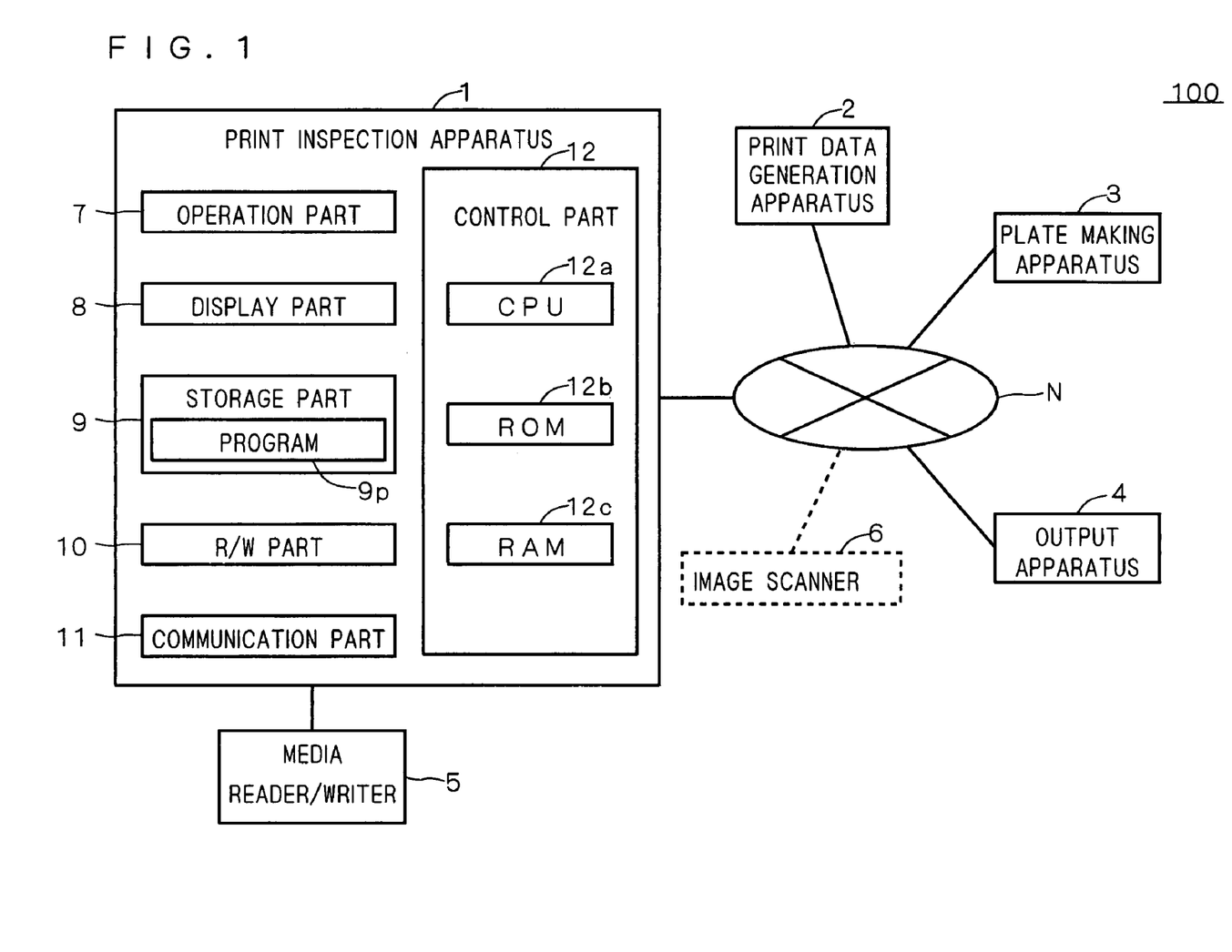
FIG. 1 is a schematic diagram illustrating a constitution of a printing system including a print inspection apparatus.

FIG. 1 is a schematic diagram illustrating a constitution of a printing system 100 including a print inspection apparatus 1 in accordance with a preferred embodiment of the present invention. The printing system 100 mainly comprises the print inspection apparatus 1, a print data generation apparatus 2, a plate making apparatus 3 and an output apparatus 4, where these apparatus are electrically connected with one another via a network N such as LAN (Local Area Network), to perform a printing work flow consisting of generation of print data, plate making, and output.

The print inspection apparatus 1 extracts whether or not there is any difference between an object image to be inspected and a reference image by comparison in order to check if instructions for correction are rightly reflected in the revised data, if there is any unexpected difference between the revised data, a printing plate or an actually-outputted printed matter and original data, or the like.

The print data generation apparatus 2 generates print data through a layout of a print image, such as typesetting and image arrangement. The generated print data is processed (rasterized) by an RIP to become multitone image data, and the image data is subjected to a post-stage work flow such as an inspection for printing. Further, there may be a case where an apparatus for performing the layout and that for performing the RIP processing are provided separately and independently from each other. In this case, layout data generated in the former apparatus is passed to the latter apparatus and subjected to the RIP processing therein, and the same function as that of the print data generation apparatus 2 is performed on the whole. Alternatively, there may be another case where the print inspection apparatus 1 has a finction of performing the RIP processing and the print data generation apparatus 2 only performs the layout and passes the layout data to the print inspection apparatus 1, and in other words, the print inspection apparatus 1 performs the RIP processing on the layout data and then performs the inspection for printing.

Furthermore, the print data generation apparatus 2 can generate image data of various resolutions depending on the use from one layout data. For example, there is a possible case where multitone image data of coarse resolution, e.g., about 400 dpi is generated for inspection and high resolution halftone image data of 2400 dpi is generated for output.

The plate making apparatus 3 is a so-called CTP apparatus, which makes a printing plate, on the basis of halftone image data, for example, by generating a print image on a plate (printing material) by laser exposure. Further, there may be a case where a plate-making film is once generated by an image setter on the basis of the halftone image data and then the printing plate is made by using the plate-making film. In this case, the plate making apparatus 3 includes the image setter.

The output apparatus 4 performs printing on printing paper by using the printing plate made by the plate making apparatus 3. Alternatively, the output apparatus 4 may perform a digital output, that is, a direct printing from the halftone image data onto the printing paper.

The print inspection apparatus 1 may receive the print data (image data) after the RIP processing, which is generated in the print data generation apparatus 2, via the network N and then perform the inspection of the print data. Alternatively, there may be a case where the print inspection apparatus 1 comprises a media reader/writer 5 such as an MO drive or a CD-R/RW drive and in the operation, the print inspection apparatus 1 reads the print data which is once stored in various portable recording media such as MO (magneto-optic disk) or CD-RIRW and performs the inspection on the print data.

If an image scanner 6 is connected to the network N, there may be a case where the image scanner 6 scans the printing plate, the plate-making film or the printed matter outputted from the output apparatus 4 to directly acquire the image data and the image data is subjected to the inspection.

The print inspection apparatus 1 is actualized by a computer. Specifically, the print inspection apparatus 1 mainly comprises an operation part 7 including a mouse, a keyboard or the like for inputting various instructions of an operator, a display part 8 such as a display, a storage part 9 including a hard disk or the like and storing a program 9p for execution to cause the computer to function as the print inspection apparatus 1, an R/W part 10 for performing read/write of the data from/into the various portable recording media through the media reader/writer 5, a communication part 11 serving as an interface for transmission of data between the print inspection apparatus 1 and the other apparatus on the network N and a control part 12 constituted of a CPU 12a, a ROM 12b and a RAM 12c, for performing finctions as discussed later.

In the print inspection apparatus 1, a GUI (Graphical User Interface) where the individual operation is performed while operations of the operation part 7 and states and conditions of various processes are displayed on the display part 8 is achieved by the functions of the control part 12, the operation part 7 and the display part 8. Operations of such parts in the control part 12 as discussed later are performed by using the GUI.

Figure 2:
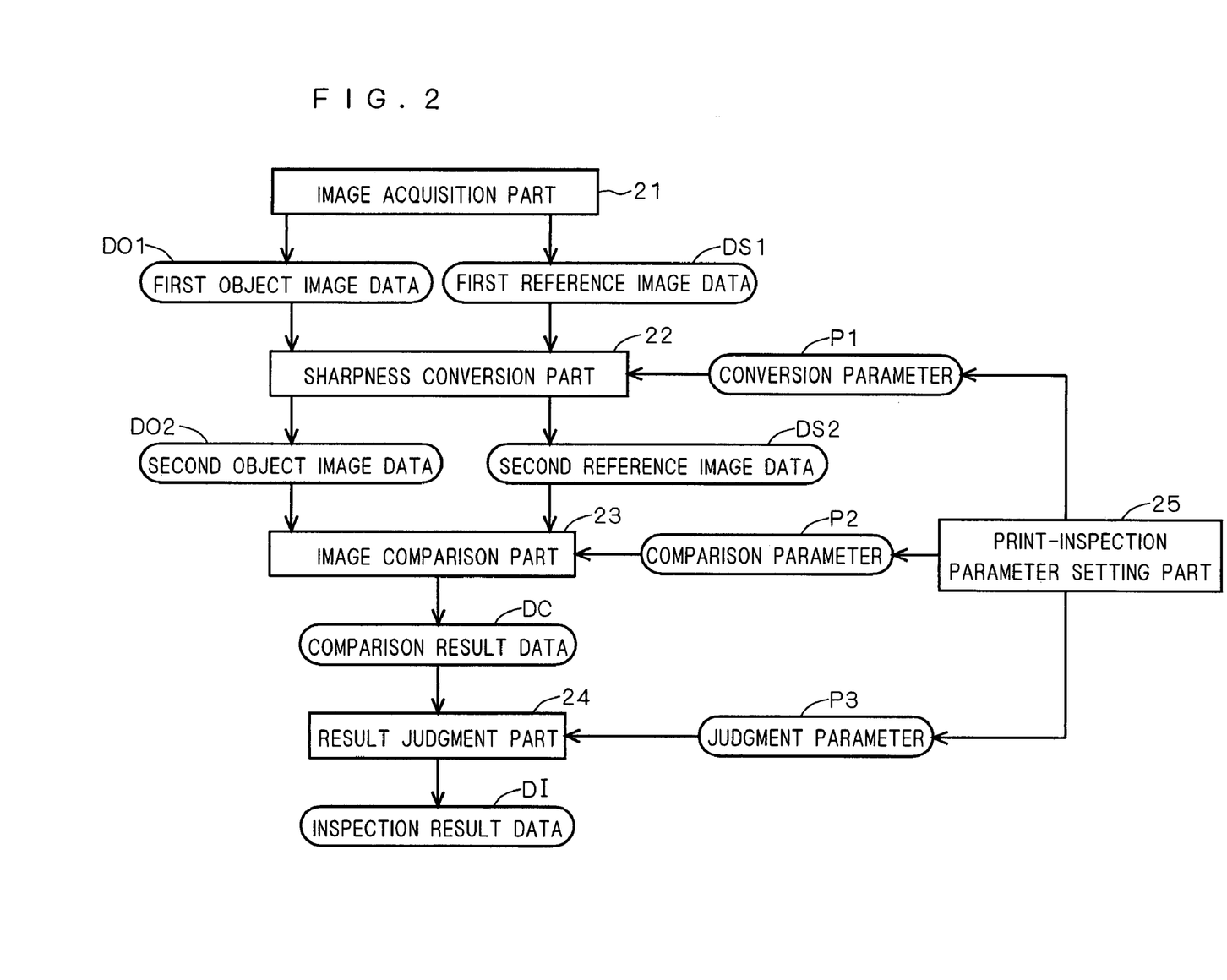
FIG. 2 is a view showing a finction achieved in a control part of the print inspection apparatus.

FIG. 2 is a view showing a finction achieved in the control part 12 of the print inspection apparatus 1.

In the control part 12, a predetermined program 9p stored in the storage part 9 is executed by the CPU 12a, the ROM 12b and the RAM 12c, to implement finctions of an image acquisition part 21, a sharpness conversion part 22, an image comparison part 23, a result judgment part 24 and a print-inspection parameter setting part 25.

The image acquisition part 21 acquires first object image data DO1 which is print data to be inspected and first reference image data DS1 which is print data serving as a reference for inspection, in accordance with an instruction given by an operator of the print inspection apparatus through the operation part 7 and the display part 8. In this case, as the print data, data which is transmitted from the print data generation apparatus 2 via the network N and stored in the storage part 9 may be acquired from the storage part 9, or data stored in a recording medium may be acquired therefrom through the media reader/writer 5. The first reference image data DS1 is, for example, print data of the first proof and the first object image data DO1 is print data of the revised proof which is corrected on the basis of a result of the first proof.

The sharpness conversion part 22 performs an image sharpness conversion on the first object image data DO1 and the first reference image data DS1 in accordance with a conversion parameter P1 by a predetermined computation such as an averaging operation to weaken the sharpness of each image. Through the image sharpness conversion, second object image data DO2 and second reference image data DS2 are generated from the first object image data DO1 and the first reference image data DS1, respectively. As the conversion parameter P1 given are the mask size and the like used in the averaging operation.

The present preferred embodiment is characterized by this image sharpness conversion, as compared with the background-art inspection for printing. Effects of the preferred embodiment will be discussed later.

The image comparison part 23 performs calculation of difference between a tone value of the second object image data DO2 and that of the second reference image data DS2 by pixel in accordance with a comparison parameter P2, to generate comparison result data DC. Depending on the content of the comparison parameter P2, there may be a case where the comparison is performed after a swing (shift) operation to simultaneously generate a plurality of comparison result data DC of different operation conditions. In this case, a swing range of pixels in the swing operation and the like are given as the comparison parameter P2.

The result judgment part 24 judges whether the differential value obtained as the comparison result data DC is significant or not from the viewpoint of the object for the inspection in accordance with the criterion of judgment which is given by a judgment parameter P3 and consequently generates final inspection result data DI. As the judgment parameter P3, for example, given are a tone margin which is the lower limit of significant differential value, an isolated point removal setting which allows removal of a differential value of not 0 which is isolatedly present only within a very small range of pixels as an unnecessary isolated point, and the like.

The print-inspection parameter setting part 25 sets the conversion parameter P1, the comparison parameter P2 and the judgment parameter P3 (collectively referred to as "print-inspection parameter"). In accordance with the print-inspection parameter set by the operator through the operation part 7 and the display part 8, the operations of these parts are performed.

Operation Flow of Inspection for Printing

Figure 3:
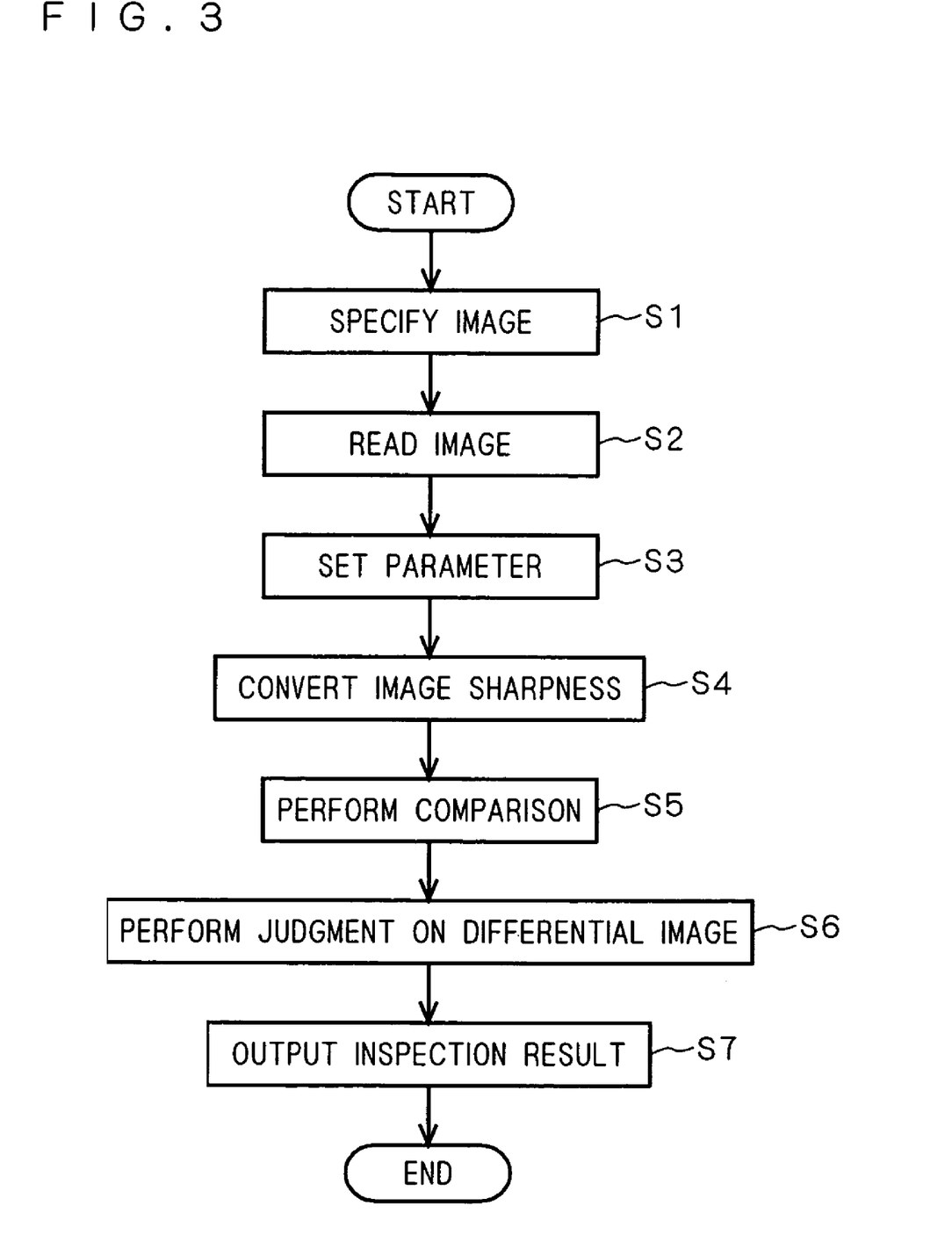
FIG. 3 is a flowchart showing an operation flow of print inspection in the print inspection apparatus.

FIG. 3 is a flowchart showing an operation flow of print inspection in the print inspection apparatus 1 in accordance with the present preferred embodiment. FIGS. 4A to 4C and 5A to 5C are schematic diagrams showing an exemplary print inspection on a linework image. FIGS. 6A and 6B are schematic diagrams showing an exemplary print inspection on a picture image. The operation flow of print inspection will be discussed, referring to FIGS. 2 to 6A and 6B.

First, the operator of the print inspection apparatus 1 specifies the first object image data DO1 and the first reference image data DS1 for the print inspection through the operation part 7 (Step S1), and then these image data are read into the RAM 12c by the operation of the image acquisition part 21 (Step S2).

Figure 4A:
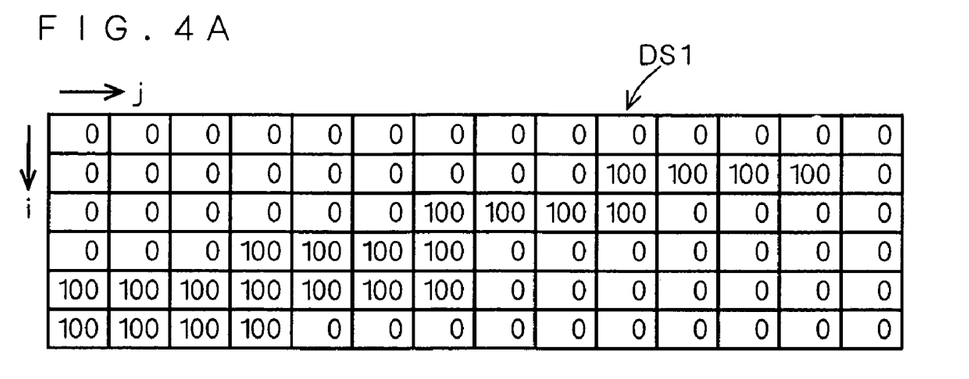
FIGS. 4A to 4C are schematic diagrams showing image data of a linework image before image sharpness conversion.
Figure 4B:
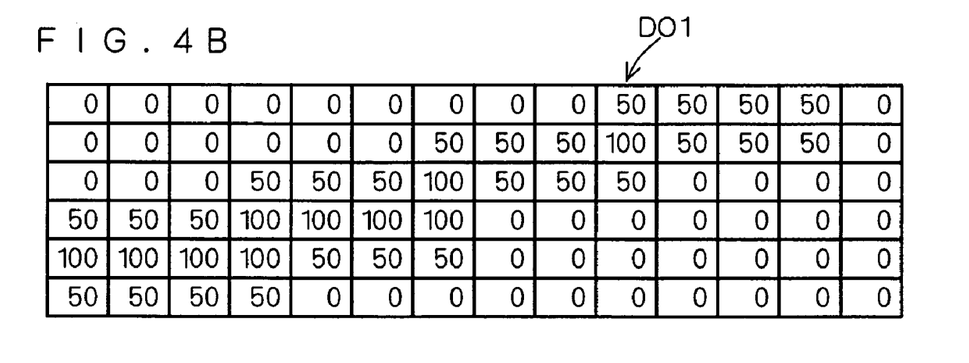
Figure 5A:
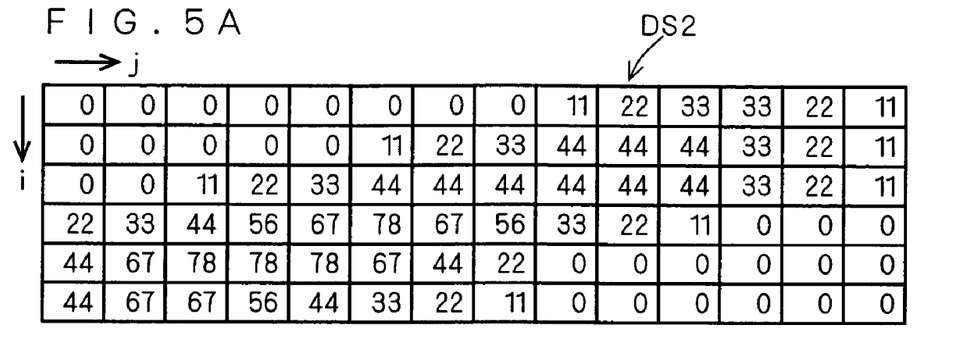
FIGS. 5A to 5C are schematic diagrams showing image data of the linework image after the image sharpness conversion.
Figure 5B:
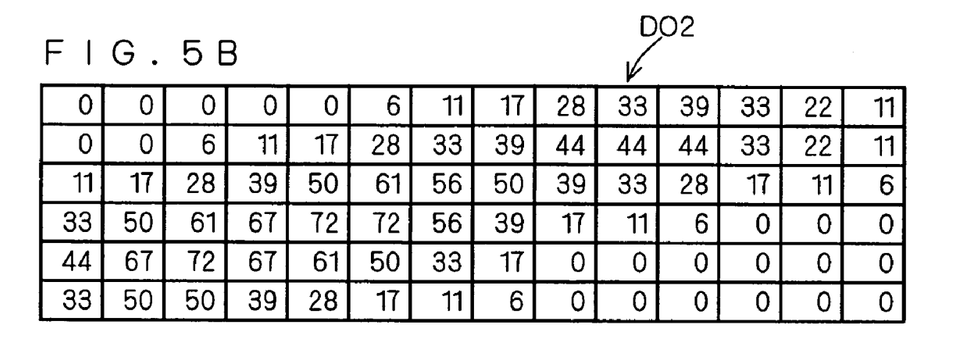

Herein, it is assumed that FIG. 4A schematically shows the first reference image data DS1 on the linework image and FIG. 4B schematically shows the corresponding first object image data DO1. In both data, a pixel on the i-th row and the j-th column from the upper left corner is represented as (i, j) (i, j: natural numbers) and a tone value of the pixel (i, j) is represented by percentage display in the (i, j)-th cell.

For simple discussion, it is assumed that in the first reference image data DS1 of FIG. 4A, a tone value of pixels forming a linework is 100% and a tone value of pixels not forming the linework is 0% in formation of image and on the other hand, in the first object image data DO1 of FIG. 4B, there is a pixel displacement where the pixels are shifted by half pixel in the (−i) direction and in other words, a tone value of pixel is shifted by 50% in the (−i) direction as compared with the first reference image data DS1, although the first object image data DO1 should be originally the same data as the first reference image data DS1.

After the first reference image data DS1 and the first object image data DO1 are read, the conversion parameter P1, the comparison parameter P2 and the judgment parameter P3 which are used in the later processing are set by the operation of the print-inspection parameter setting part 25 (Step S3). This setting may be achieved by reading a set value which is stored in the storage part 9 in advance or may be performed during the inspection for printing. Alternatively, these parameters may be set in the later respective steps.

After the print-inspection parameter is set, an image sharpness on each image data is converted by the operation of the sharpness conversion part 22 (Step S4). It is assumed herein that the averaging operation is performed within the range of 3×3 pixels, for example, by using an averaging mask. The size of averaging mask and the like are given as the conversion parameter P1. Specifically, assuming that a tone value of the pixel (i, j) before conversion is G1 (i, j) and a tone value thereof after the averaging operation is G2 (i, j), conversion of tone value on each pixel (i, j) is performed by computation of the following equation, $$G2(i, j) = \Sigma G1(k, 1)/9 \quad \text{(Eq. 1)}$$

where k=i−1, i, i+1, 1=j−1, j, j+1. As a result, the second reference image data DS2 and the second object image data DO2 are obtained from the first reference image data DS1 and the first object image data DO1, respectively. FIG. 5A shows the second reference image data DS2 and FIG. 5B shows the second object image data DO2, where numbers of decimal places are rounded.

Comparing the first reference image data DS1 with the second reference image data DS2, it is found that the former is complete binary data including only pixels having tone values of 0% and 100% and the latter is data including pixels having tone values of intermediate numbers between 0% and the maximum tone value of 78% that the pixel (5, 3) and the like have. In other words, through the computation of Eq. 1 generated is image data which is graded by weakening its image sharpness.

After the second reference image data DS2 and the second object image data DO2 are obtained through the image sharpness conversion, these image data are compared with each other by the operation of the image comparison part 23 (Step S5). The comparison can be performed by using the well-known technique.

Assuming that a pixel value of the second reference image data for the pixel (i, j) is Gs (i, j) and a pixel value of the second object image data is Go (i, j), when comparison is performed with the second object image data DO2 swung (with its pixel position shifted) by m pixels in the i direction and by n pixels in the j direction (m, n: integers), a differential value ΔG (i, j) of the tone value is obtained as;

$$\Delta G(i, j) = Go(i-m, j-n) - Gs(i,j) \quad \text{(Eq. 2)}$$

The shifted pixel values m and n in the swing (shift) operation are given as the comparison parameter P2. Repeating the computation of Eq. 2 with the values m and n changed, a plurality of comparison result data DC are consequently obtained.

Figure 5C:
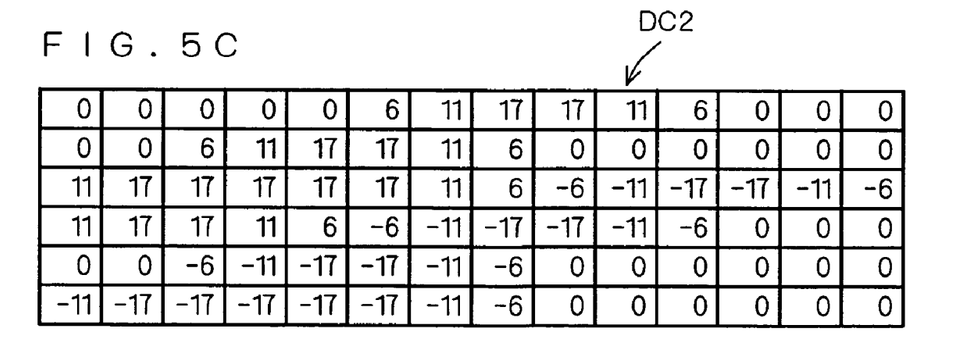
Figure 6A:
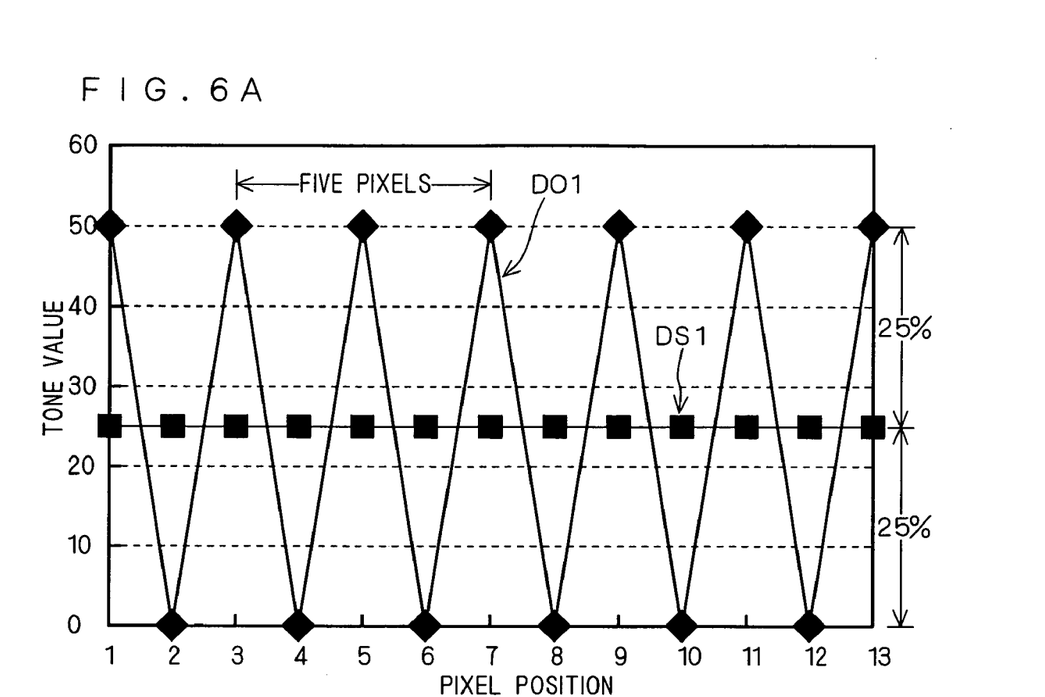
FIGS. 6A and 6B are schematic diagrams showing image data of a picture image before and after the image sharpness conversion.
Figure 6B:
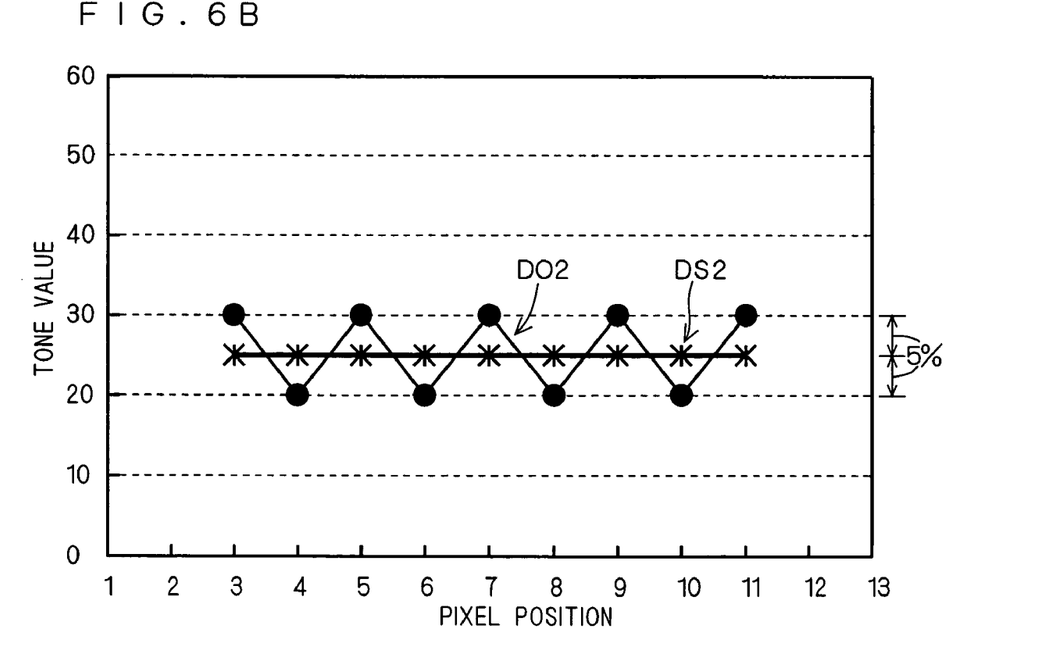

For simple discussion, FIG. 5C shows distribution of the differential value ΔG (i, j) obtained by the computation of Eq. 2 without the swing (shift) operation, in other words, with the values m and n made 0 in Eq. 2, i.e., comparison result data DC.

After the comparison result data DC is obtained, a differential-image judgment for judging whether a significant difference is caused in the comparison result date DC or not is performed in accordance with the judgment parameter P3 by the operation of the result judgment part 24 (Step S6). The judgment by the result judgment part 24 can be performed by using the well-known technique.

Figure 4C:
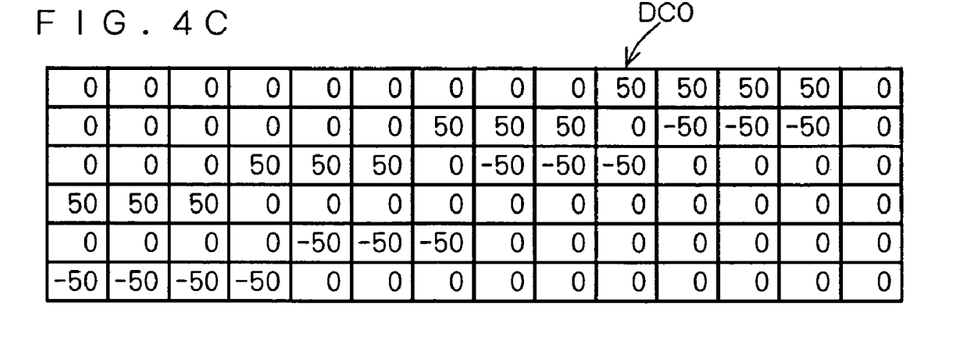

For reference, FIG. 4C shows conventional data DC0 which is obtained in a case without the image sharpness conversion, in other words, in a case of performing the background-art inspection for printing.

Comparing the conventional data DC0 with the comparison result data DC, it is found that the former includes differential values in a range of ±50% with respect to 0% and the later includes differential values only in a range of ±17%. Since the first object image data DO1 to be inspected is originally the same data as the first reference image data DS1, it should be basically judged that there is no difference between these data. When data such as the conventional data DC0 is obtained, however, in order to make the above judgment, it is necessary to set the judgment parameter P3 so as to permit the difference of tone value by ±50%, but this setting is not practical as it substantially makes it impossible to detect a significant difference.

On the other hand, since the comparison result data DC of the present preferred embodiment has distribution of differential values in the range of ±17%, it is possible to narrow the tolerance of differential value in the judgment parameter to about one third of the conventional range.

Thus, the judgment is performed on the comparison result data DC in accordance with the criterion of the judgment parameter P3 to extract only significant differences which probably become a problem in the inspection process and later, and inspection result data DI is outputted, stored in the storage part 9 and displayed on the display part 8 (Step S7). Not only the inspection result data DI but also those data and parameters such as the first object image data DO1, the first reference image data DS1 and the print-inspection parameter may be stored in the storage part 9 and displayed on the display part 8 as appropriate. Further, these data and parameters may be printed by a not-shown printer for result output.

FIG. 6 is a view indicating that the image sharpness conversion is effective also for a picture image. FIG. 6A one-dimensionally illustrates the first reference image data DS1 and the first object image data DO1 in a tint area where the tone value is 25%. While the first reference image data DS1 indicates a case where pixels at all the pixel positions each have a tone value of 25%, the first object image data DO1 indicates a case where pixels having a tone value of 50% and pixels having a tone value of 0% are alternately distributed to achieve a tint area having a tone value of 25% on the average. In other words, the first object image data indicates a case where there is a pixel displacement just by half pixel as viewed from the first reference image data. In this case, if the image sharpness conversion is not performed, there is a difference having a value of ±25% at each pixel position as shown in FIG. 6A.

On the other hand, FIG. 6B shows the second reference image data DS2 and the second object image data D02 obtained through the image sharpness conversion with an averaging mask having a size of 5 pixels. This corresponds to a result obtained through the image sharpness conversion with a mask of 5×5 on a two-dimensional image. In this case, the differential value between these data is reduced to ±5%.

The above operation using a mask of 3×3 or 5×5 as computation in the image sharpness conversion is equivalent to an operation for obtaining an image whose resolution is reduced to about one third or one fifth of its original resolution. Therefore, when image data having a resolution of 400 dpi which is a typical one for inspection is acquired, if an image sharpness conversion is performed by an averaging operation preferably with a mask having a larger size, i.e., 7×7 in a wide range to obtain an image having a resolution of about 60 dpi which is about one seventh of its original resolution, it is possible to set the tolerance of differential value in the judgment parameter P3 at a more practical level (e.g., several percent or so). In other words, with the grading operation for weakening the image sharpness, the print inspection is performed by using image data having a sharpness at such a level as the difference is distinguishable by human's visual property, avoiding detection of differential value at an invisible level which is caused by the pixel displacement in subpixel order, and it is therefore possible to efficiently obtain a print inspection result with an accuracy almost as high as that by visual inspection.

Thus, by providing the sharpness conversion part for converting the image sharpness in the print inspection apparatus, it is possible to obtain a print inspection result with an accuracy almost as high as that by human's visual property and therefore possible to efficiently obtain an effective print inspection result.

Variation

Figure 7:
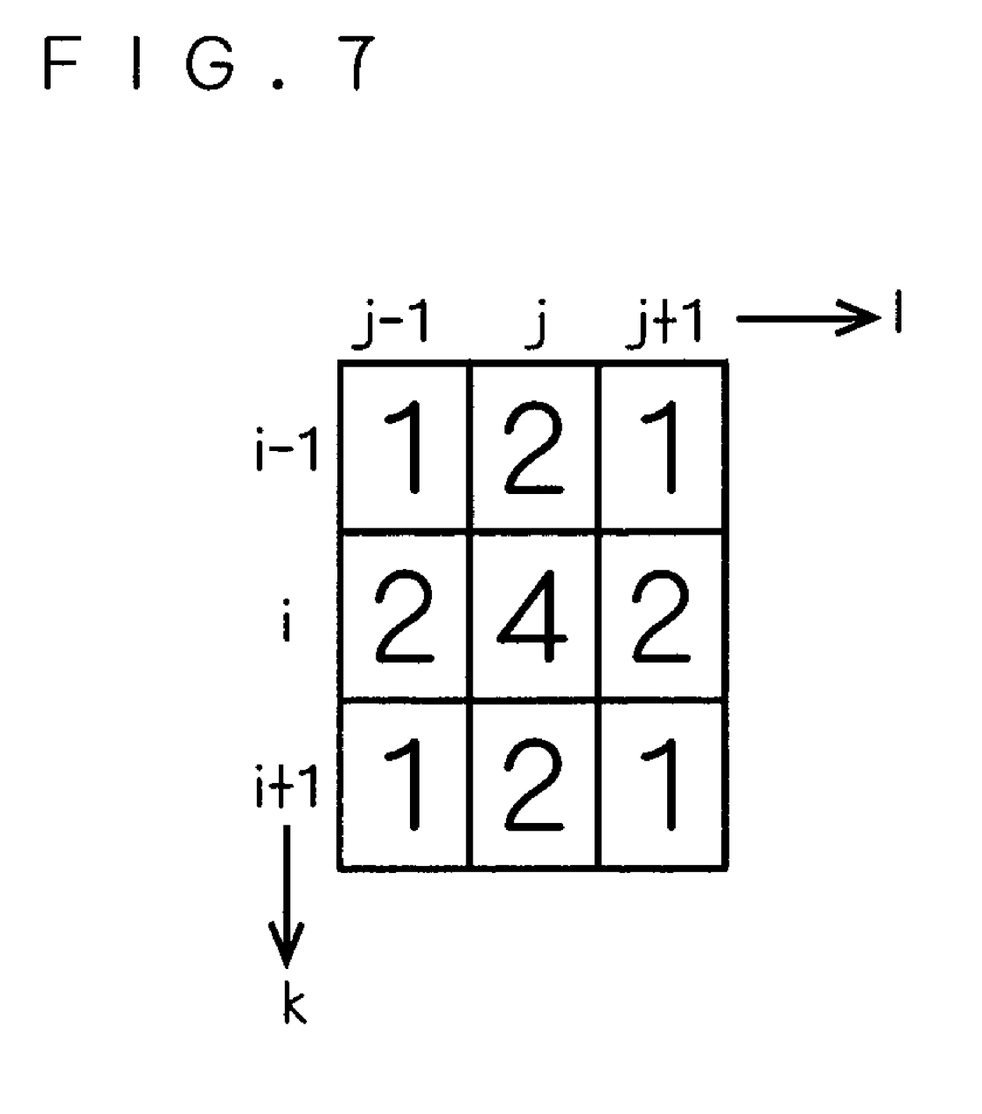
FIG. 7 is a view showing an example of weighting factor H (k, 1).

The "average-masking operation" is not limited to such as discussed above but a "weighted average-masking operation" where different weights are added to the pixels may be performed. In this case, assuming that a tone value of the pixel (i, j) before conversion is G1 (i, j) and a tone value thereof after the averaging operation is G2 (i, j), conversion of tone value on each pixel (i, j) is performed by computation of the following equation, $$G2(i, j) = \Sigma G1\{(k, 1) \times H(k, 1)\}/\Sigma H(k, l) \quad \text{(Eq. 3)}$$

where k=i−1, i, i+1, 1=j−1, j, j+1. In Eq. 3, H (k, 1) represents aweighting factor. FIG. 7 is a view showing an example of weighting factor H (k, 1l).

The average-masking operation of the above-discussed present preferred embodiment corresponds to a special case of the weighted average-masking operation where H (k, 1)=1 for all k and 1.

While the invention has been shown and described in detail, the foregoing description is in all aspects illustrative and not restrictive. It is therefore understood that numerous modifications and variations can be devised without departing from the scope of the invention.

What is claimed is:

1. A print inspection apparatus, comprising:
   an image sharpness conversion element for weakening an image sharpness of inspection object data which is acquired in a processing on print image data and that of reference data which represents an image condition as a reference for comparison with said inspection object data by performing an average-masking operation on pixels constituting said inspection object data and pixels constituting said reference data on the basis of a predetermined mask size, respectively;
   a comparison element for comparing said inspection object data and said reference data with each other after weakening their respective image sharpnesses, thereby generating comparison result data which describes a difference between a tone value of the said object image data and that of said reference image data by pixel; and
   a judgment element for judging whether said difference is significant or not in accordance with a predetermined judgment parameter, thereby generating inspection result data which represents a result of judgment.

2. A method of performing an inspection for printing, comprising the steps of:
   (a) weakening an image sharpness of inspection object data which is acquired in a processing on print image data and that of reference data which represents an image condition as a reference for comparison with said inspection object data by performing an average-masking operation on pixels constituting said inspection object data and pixels constituting said reference data on the basis of a predetermined mask size, respectively;
   (b) comparing said inspection object data and said reference data with each other after weakening their respective image sharpnesses, thereby generating comparison result data which describes a difference between a tone value of the said object image data and that of said reference image data by pixel; and
   (c) judging whether said difference is significant or not in accordance with a predetermined judgment parameter, thereby generating inspection result data which represents a result of judgment.

3. A printing system which generates print image data and performs at least one of plate making and output on the basis of said print image data, comprising:
   (a) a print inspection apparatus for performing an inspection of said print image data, which comprises
   (a-1) an image sharpness conversion element for weakening an image sharpness of inspection object data which is acquired in a processing on said print image data and that of reference data which represents an image condition as a reference for comparison with said inspection object data by performing an average-masking operation on pixels constituting said inspection object data and pixels constituting said reference data on the basis of a predetermined mask size, respectively;
   (a-2) a comparison element for comparing said inspection object data and said reference data with each other after converting their respective image sharpnesses, thereby generating comparison result data which describes a difference between a tone value of the said object image data and that of said reference image data by pixel, and
   (a-3) a judgment element for judging whether said difference is significant or not in accordance with a predetermined judgment parameter, thereby generating inspection result data which represents a result of judgment.

4. The printing system according to claim 3, further comprising:
   (b) an image reader capable of reading at least one of images for a printing plate, a plate-making making film and a printed matter,
   wherein image data acquired by said image reader becomes at least one of said inspection object data and said reference data.

5. A program stored in and executed by a computer to cause said computer to function as a print inspection apparatus comprising:
   an image sharpness conversion element for weakening an image sharpness of inspection object data which is acquired in a processing on print image data and that of reference data which represents an image condition as a reference for comparison with said inspection object data by performing an average-masking operation on pixels constituting said inspection object data and pixels constituting said reference data on the basis of a predetermined mask size, respectively;
   a comparison element for comparing said inspection object data and said reference data with each other after weakening their respective image sharpnesses, thereby generating comparison result data which describes a difference between a tone value of the said object image data and that of said reference image data by pixel; and
   a judgment element for judging whether said difference is significant or not in accordance with a predetermined judgment parameter, thereby generating inspection result data which represents a result of judgment.

* * * * *